US007814085B1

(12) United States Patent
Pfleger et al.

(10) Patent No.: US 7,814,085 B1
(45) Date of Patent: Oct. 12, 2010

(54) SYSTEM AND METHOD FOR DETERMINING A COMPOSITE SCORE FOR CATEGORIZED SEARCH RESULTS

(75) Inventors: Karl Pfleger, Mountain View, CA (US); Brian Larson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1058 days.

(21) Appl. No.: 10/787,648

(22) Filed: Feb. 26, 2004

(51) Int. Cl.
  *G06F 7/00* (2006.01)
  *G06F 17/30* (2006.01)
(52) U.S. Cl. ............... 707/708; 707/710; 707/748; 707/749; 707/750
(58) Field of Classification Search .............. 707/3, 707/6, 5, 7, 1, 708, 710, 748, 749, 750; 704/7; 705/14
See application file for complete search history.

(56) References Cited

U.S. PATENT DOCUMENTS

| | | | |
|---|---|---|---|
| 6,285,999 B1 | 9/2001 | Page | |
| 6,920,448 B2 * | 7/2005 | Kincaid et al. | 707/3 |
| 6,963,867 B2 * | 11/2005 | Ford et al. | 707/3 |
| 7,028,026 B1 * | 4/2006 | Yang et al. | 707/3 |
| 7,062,485 B1 * | 6/2006 | Jin et al. | 707/3 |
| 7,062,487 B1 * | 6/2006 | Nagaishi et al. | 707/6 |
| 2002/0099685 A1 * | 7/2002 | Takano et al. | 707/1 |
| 2002/0099700 A1 * | 7/2002 | Li | 707/5 |
| 2002/0169764 A1 * | 11/2002 | Kincaid et al. | 707/3 |
| 2003/0195877 A1 * | 10/2003 | Ford et al. | 707/3 |
| 2004/0260534 A1 * | 12/2004 | Pak et al. | 704/7 |
| 2005/0021397 A1 * | 1/2005 | Cui et al. | 705/14 |
| 2005/0060311 A1 * | 3/2005 | Tong et al. | 707/7 |
| 2005/0080772 A1 * | 4/2005 | Bem | 707/3 |

\* cited by examiner

*Primary Examiner*—John E Breene
*Assistant Examiner*—Giovanna Colan
(74) *Attorney, Agent, or Firm*—Fish & Richardson P.C.

(57) ABSTRACT

A system and method for scoring documents is described. One or more documents are identified responsive to a search criteria. A text match score indicating a quality of match of the identified documents is determined. A category match score is determined over categories. A document-categories score is determined indicating a quality of match between an identified document and a plurality of categories. A search criteria-categories score is determined indicating a quality of match between the search criteria and the categories. An overall score is determined based on the text match score and the category match score.

45 Claims, 10 Drawing Sheets

110

120

SYSTEM AND METHOD FOR DETERMINING A COMPOSITE SCORE FOR CATEGORIZED SEARCH RESULTS

FIELD OF THE INVENTION

The invention relates in general to search result scoring and, in particular, to a system and method for determining a composite score for categorized search results.

BACKGROUND OF THE INVENTION

Although the origins of the Internet trace back to the late 1960s, the more recently-developed Worldwide Web ("Web"), together with the long-established Usenet, have revolutionized accessibility to untold volumes of information in stored electronic form to a worldwide audience, including written, spoken (audio) and visual (imagery and video) information, both in archived and real-time formats. The Web provides information via interconnected Web pages that can be navigated through embedded hyperlinks. In short, the Web provides desktop access to a virtually unlimited library of information in almost every language. The Web has proven particularly helpful in facilitating on-line shopping by providing easy access to helpful information and to resources often unavailable in a conventional "brick and mortar" store.

Search engines have evolved in tempo with the increased usage of the Web to enable users to find and retrieve relevant Web content in an efficient and timely manner. As the amount and types of Web content has increased, the sophistication and accuracy of search engines has likewise improved. Search engines strive to provide responsive and quality search results. Determining quality is difficult, though, as the relevance of retrieved Web content is inherently subjective and dependent upon the interests, knowledge and attitudes of the user.

News messages available via the Usenet are cataloged into specific news groups and finding relevant content involves a straightforward searching of news groups and message lists. Web content, however, is not organized in a structured manner, such as by providing labels, clusters or categories that map Web content by shared property or meta characteristic. Search engines have evolved to help users find and retrieve relevant Web content, as well as news messages and other content types. Existing methods used by search engines are based on matching search query terms to terms indexed from Web pages. More advanced methods determine the importance of retrieved Web content using, for example, a hyperlink structure-based analysis, such as described in S. Brim and L. Page, "The Anatomy of a Large-Scale Hypertextual Search Engine," (1998) and in U.S. Pat. No. 6,285,999, issued Sep. 4, 2001 to Page, the disclosures of which are incorporated by reference.

Despite improvements in Web content searching, not all Web content is equally retrievable. For instance, some types of Web content are esoteric and may be referenced so infrequently that relatively few hyperlinks are available for a search engine to identify and exploit. Similarly, other types of Web content, such as advertisements, are short-lived and can change frequently, often making retrieval a matter of timing, rather than based on quality of match. Still other types of Web content, especially advertisements, are highly repetitive and duplicate a significant amount of content between individual Web pages.

One approach to searching poorly retrievable Web content resorts to basic text matching. Those types of Web content that tend to yield poor quality search results due to few hyperlink references, short duration or highly repetitive content, are grouped into a separate search corpus. Search results are then identified from the search corpus based on the quality of matching of search query terms to individual documents. The search results having the most text matches can be scored or ranked in quantitative terms by relative goodness of match.

Although text matching may yield relevant results, basic text matching suffers several drawbacks. First, the search query terms are treated in literal fashion and other relevant Web content may be overlooked or omitted. Similarly, search query terms or phrases may have different senses, which can result in an ambiguous search query. The score or rank only quantitatively reflects goodness of match and not quality of match. For example, a search engine could identify several documents in response to a search query requesting, "35 mm Camera." However, only those documents substantively relating to particular camera models, versus camera accessories or film supplies, would be qualitatively better matches.

Therefore, there is a need for an approach to qualitatively scoring Web content identified through text matching based additionally on associated and weighted categories. Preferably, such an approach will score both the identified content and individual search query for quality of match to the categories.

SUMMARY OF THE INVENTION

An embodiment provides a system and method for scoring documents. One or more documents are identified responsive to a search criteria. A text match score is determined indicating a quality of match of the identified documents. A category match score is determined over categories. A document-categories score is determined indicating a quality of match between an identified document and a plurality of categories. A search criteria-categories score is determined indicating a quality of match between the search criteria and the categories. An overall score is determined based on the text match score and the category match score.

A further embodiment provides a system and method for scoring documents. A label is annotated to each of a plurality of documents to form groups of the documents each sharing at least one such label. One or more of the documents is identified responsive to a search query including one or more query terms executed against a text corpus including a plurality of the labeled documents. A text match score is determined indicating quality of match between the query terms of the search query and the identified documents. A label match score is determined. A document-labels score is determined indicating a quality of match between the identified documents and a plurality of labels. A query-labels score is determined indicating a quality of match between the search query and the labels. The text match score and the label match score are blended.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

System Overview

Figure 1:
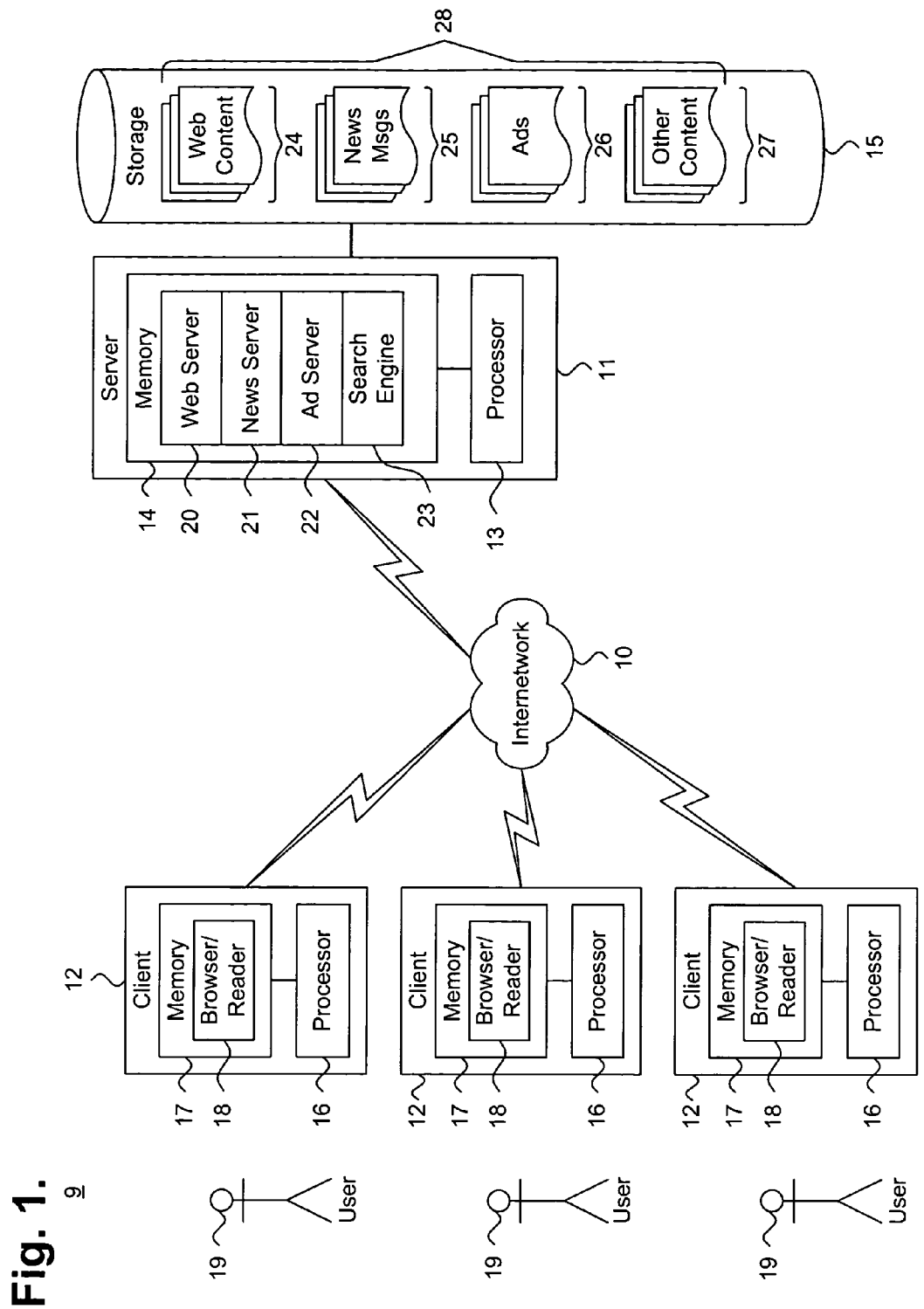
FIG. 1 is a block diagram showing a system for determining a composite score for categorized search results, in accordance with the invention.

FIG. 1 is a block diagram showing a system 9 for determining a composite score for categorized search results, in accordance with the invention. A plurality of individual clients 12 are communicatively interfaced to a server 11 via an internetwork 10, such as the Internet, or other form of communications network, as will be appreciated by one skilled in the art. The individual clients 12 are operated by users 19 who transact requests for Web content, news messages, advertisements, other types of content, and other operations through their respective client 12.

Each client 12 can be any form of computing platform connectable to a network, such as the internetwork 10, and capable of interacting with application programs. Exemplary examples of individual clients include, without limitation, personal computers, digital assistants, "smart" cellular telephones and pagers, lightweight clients, workstations, "dumb" terminals interfaced to an application server, and various arrangements and configurations thereof, as will be appreciated by one skilled in the art. The internetwork 10 includes various topologies, configurations, and arrangements of network interconnectivity components arranged to interoperatively couple with enterprise, wide area and local area networks and include, without limitation, conventionally wired, wireless, satellite, optical, and equivalent network technologies, as will be appreciated by one skilled in the art.

For Web content retrieval and news message posting and retrieval, each client 12 executes a Web browser or news reader application 18 ("Browser/Reader"). Web content 24 is requested via a Web server 20 executing on the server 11. Similarly, news messages ("News Msgs") 25 are posted and retrieved via a news server 21 also executing on the server 11. In addition, advertisements ("Ads") 26 are provided with the Web content 24, news messages 25, and other content 27 via an advertisement server ("Ad Server") 22 also executing on the server 11. Other types of server functionality can be provided, as will be appreciated by one skilled in the art. Note the Web browsing, news reading, and advertising functions could also be implemented separately as stand alone applications.

The server 11 maintains an attached storage device 15 in which the Web content 24, news messages 25, advertisements 26, and other content 27 (collectively referred to as simply "content 28") are stored. The content 28 could also be maintained remotely on other Web and news servers (not shown) interconnected either directly or indirectly via the internetwork 10 and which are preferably accessible by each client 12.

A search engine 23 executes on the server 11 for processing queries for content 28. Each query is meant to describe or otherwise identify information potentially retrievable via either the Web server 20 or other servers. The information can include other information also determined to be relevant to the query. In one embodiment, each query provides characteristics, typically expressed as terms, including individual words and compounds. The search engine 23 receives a query, identifies matching content 28 and sends back results conforming to the query preferences. Other styles, forms or definitions of queries, query characteristics, and related metadata are feasible, as will be appreciated by one skilled in the art.

In one embodiment, the search engine 23 identifies the content 28 determined to be highly relevant in relation to a given set of search query terms, for example, using such techniques as described in S. Brim and L. Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching content 28, the search engine 23 operates on information characteristics describing potentially retrievable content. Note the functionality provided by the server 20, including the Web server 20, news server 21, advertising server 22, and search engine 23, could be provided by a loosely- or tightly-coupled distributed or parallelized computing configuration, in addition to a uniprocessing environment.

In one embodiment, the content 28 is supplemented with a set of categories to assist the search engine 23 in identifying content. The categories identify and aggregate the content 28, particularly documents, into generalized groups preferably sharing some form of common traits and characteristics. Individual documents and word and word phrases are associated by relative strength of correlation to individual categories. A scoring engine (not shown) references the association strengths to determine a composite score based on search query and category matches for use by the search engine 23, as further described below with reference to FIG. 2.

The individual computer systems, including server 11 and clients 12, include general purpose, programmed digital computing devices including a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Scoring Engine

Figure 2:
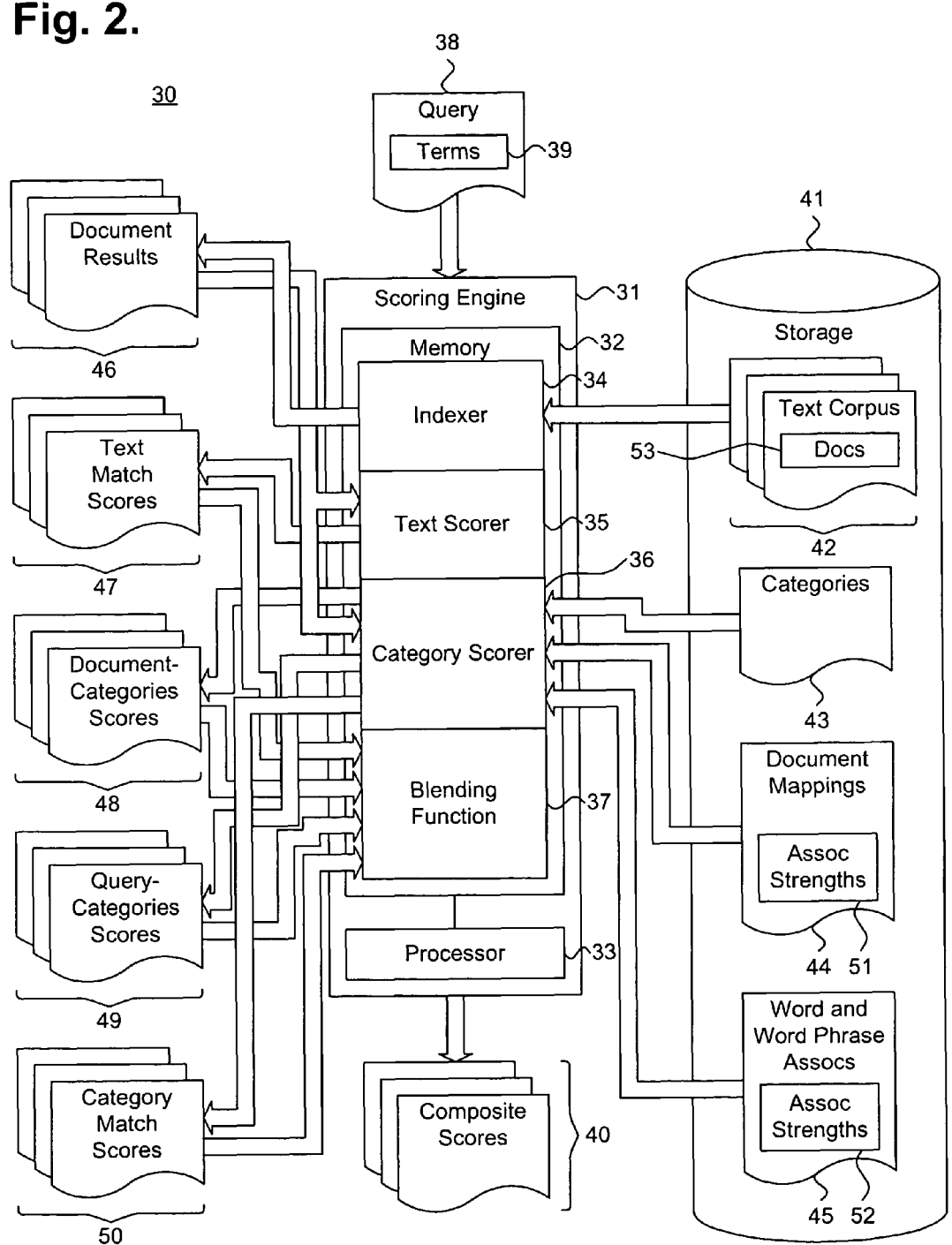
FIG. 2 is a functional block diagram showing a scoring engine, in accordance with one embodiment.

FIG. 2 is a functional block diagram 30 showing a scoring engine 31, in accordance with one embodiment. The scoring engine 31 matches each search query 38 received from a user 19 to documents 53 stored in a text corpus 42 to generate search results 46. The scoring engine 31 then references a set of categories 43 using individual search query terms 39, one or more parts of the search query 38, or the complete search query 38, and the search results 46 to determine text match scores 47 and category scores 48, 49. These scores are combined into a composite score 40, which is provided to the search engine 23 for further evaluation in providing the content 28. In a further embodiment, compound words are identified for inclusion as part of a search query 38, such as described in commonly-assigned U.S. patent application Ser. No. 10/647,203, filed Aug. 21, 2003, pending, the disclosure of which is incorporated by reference.

The scoring engine 31 includes storage for maintaining the text corpus 42, categories 43, document mappings 44, and word and word phrase associations 45. The text corpus 42 includes documents 53 and excerpts of the documents 53 that include content stored by the server 11 (shown in FIG. 1), as well as documents and excerpts from other sources.

The categories 43 are indexed and searchable by the scoring engine 31 and can be provided as a list, organized in a hierarchical fashion, as further described below, by way of example, with reference to FIGS. 4A-D, or defined in any searchable form of data structure. The categories 43 can be used to efficiently cluster or aggregate multiple individual documents 53 into generalized groups and can significantly decrease the misidentification of related, but less relevant documents 53. The categories 43 can be arbitrary or descriptive, can reflect product or service information and characteristics, or can reflect interrelationships and independencies between other categories 43 or advertisements 26. In a further embodiment, multiple categories can be used.

The document mappings 44 associate documents 53 with the categories 43. The word and word phrase associations 45 associate individual words and word phrases with the categories 43. The individual words and word phrases can appear as search query terms, as part of or as a complete search query 38, or in other ways, such as derived or determined from the topics or concepts associated with an article or document. Each document mapping 44 may include association strengths ("Conf") 51 reflecting the relative degree to which the document 53 matches each corresponding category 43. Similarly, the word and word phrase associations 45 defines word-category and word phrase-category associations that include a association strength ("Conf") 52 reflecting the relative degree to which each word or word phrase matches a corresponding category 43. Each document-category mapping 44, word-category association and word phrase-category association may have a separate association strength 51, 52 and each document 53, word and word phrase 45 can be associated with one or more of the categories 43. Other types of confidence measures are possible. Category definitions, document-to-category mappings, and word- and word phrase-to-category associations can be pre-computed prior to execution of a query 38. In a further embodiment, the category definitions, document-to-category mappings, and word- and word phrase-to-category associations can be computed dynamically, or can include a combination of dynamically computed and pre-computed values.

The document mappings 44 may be initially formed through manual mapping or via automatic clustering on a category-by-category basis. The individual document 44 mappings can be used as training data for an automated classifier, such as a Naïve Bayes classifier, to enable the formation of further document mappings 44. Similarly, the word and word phrase associations 45 associations may be initially formed through an analysis of system logs and documents 53 from the text corpus 42, which help identify those categories 43 most frequently associated with a particular word or word phrase. The individual word-category and word phrase-category associations can also be used as training data for an automated classifier to form further word and word phrase associations 45.

The scoring engine 31 includes an indexer 34, text scorer 35, category scorer 36, and blending function 37. The indexer 34 executes a search by evaluating the search query 38 against the text corpus 42 to generate a set of document results 46. In a further embodiment, the search query 38 can be expanded by integrating additional information, such as categories 43 of products or services, or through a combination of actual content, such as product names, and categories 43.

In a further embodiment, the terms 40 of the search query 38 are broadened to modify the scope of the search query 38, such that the search results reflect an increased breadth, rather than a narrowing, limiting, or otherwise restricting of the search scope. Search query broadening is described, for instance, in commonly-assigned U.S. patent application Ser. No. 10/629,479, filed Jul. 28, 2003, pending, the disclosure of which is incorporated by reference. The indexer 34 can integrate the broadened terms when executing advertisement searches against the information and characteristics maintained in documents 53.

In a still further embodiment, a search query 38 may not be necessary or need not be entered; instead, the concept or topic of a document 53, such as a Web page, can be used to determine other documents 53, including the advertisements 26, that may then be ordered or ranked, such as described in commonly-assigned U.S. patent application Ser. No. 10/389,688, filed Mar. 14, 2003, pending; U.S. patent application Ser. No. 10/375,900, filed Feb. 26, 2003, pending; U.S. patent application Ser. No. 10/314,427, filed Dec. 6, 2002, pending; and U.S. Provisional Patent application Ser. No. 60/413,536, filed Sep. 24, 2002, pending, the disclosures of which are incorporated by reference.

In one implementation, the indexer 34 may identify thousands or even millions of document results 46, so only a subset of the document results 46, such as, in this implementation, between 100 to 10,000, are retained as the most promising document results 46. The most promising document results 46 are then qualitatively ranked or scored by degree of match to the terms 39 of the search query 38. The text scorer 35 assigns a text match score 47 to each document result 46 for indicating a quality of match and the text match scores 47 are used by the blending function 37 to determine the composite score 40.

The category scorer 36 generates document-categories scores 48, query-categories scores 49, and category match scores 50. Document-categories scores 48 measure the closeness of fit between the document results 46 and one or more categories 43. Similarly, the query-categories scores 49 measure the closeness of fit between the search query 38 and one or more categories 43. In one embodiment, the document-categories scores 48 and query-categories scores 49 are expressed as functions of the respective association strengths 51, 52 associated with the document mappings 44 and word and word phrase associations 45. In a further embodiment, search criteria-category scores are used instead of the query-categories scores 49 when a search query 38 is either unnecessary or need not be entered.

The category match scores 50 combine the document-categories scores 48 and query-categories scores 49 for a given set of document results 46. For example, the category match scores 50 can be calculated as the dot product of vectors storing the document-categories scores 48 and query-categories scores 49, in accordance with the equation of the form:

$$D \cdot C = \sum_{i=1}^{n} d_i c_i \qquad [1]$$

where D is the vector containing the document-categories scores 48, C is the vector containing the query-categories scores 49 and n is the number of categories 43.

In a further embodiment, category match scores 50 are calculated for only the top n categories 43 for the query-categories scores 49, where n equals ten or similar limit and with a bias for document-categories scores 48 based on manually mapped data.

Finally, the blending function 38 calculates the composite scores 40 based on the text match scores 47 and category match scores 50. The composite scores 40 can improve upon the text match scores 47 by factoring in the relative degrees of match for the document results 46 based on the association strengths 51, 52 of the document mappings 44 and word and word phrase associations 45. For example, the composite scores 40 can help resolve ambiguous search queries 43 by factoring in the qualitative weights assigned to potentially ambiguous words and word phrases using the word-category and word phrase-category associations in the word and word phrase associations 45.

Numerous approaches to determining the composite scores 40 are available. For example, each composite score 40 can be determined as a weighted linear combination by simply adding, multiplying, or otherwise combining the text match scores 47 and category match scores 50. Each composite score 40 can be determined as a weighted combination of the form:

$$\alpha \cdot S_t + \beta \cdot S_c \quad [2]$$

where $S_t$ is the text match score 47, $S_c$ is the category match score 50 and $\alpha$ and $\beta$ are weighting factors. Additionally, each composite score 40 can be determined as a weighted combination in accordance with an equation of the form:

$$\alpha \cdot S_t + \beta \cdot S_c + \gamma \cdot S_t \cdot S_c \quad [3]$$

where $S_t$ is the text match score 47, $S_c$ is the category match score 50, $\alpha$, $\beta$ and $\gamma$ are weighting factors. Note that in this embodiment, the last term, $\gamma \cdot S_t \cdot S_c$, can operate as a soft logical AND function such that receiving a high composite score generally requires both a reasonably high text match score 47 and a reasonably high category match score 50. Numerous other forms of blending functions to combine the text match scores 47 and category match scores 50 are possible.

Although described with reference to categories of documents, other arrangements or arbitrary groupings of documents are also contemplated, as would be appreciated by one skilled in the art. One or more of the documents could be annotated with a label and those documents sharing the same label could be grouped or clustered into a common group. For example, shopping documents could be mapped into a product taxonomy, news articles could be organized by topic, and Web documents could be grouped by language or clustered into genres describing the style, type or class of each document.

The individual computer system, including the scoring engine 31, include general purpose, programmed digital computing devices including a central processing unit (processor 33), random access memory (memory 32), non-volatile secondary storage 37, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Composite Scoring Process Flow Example

Figure 3:
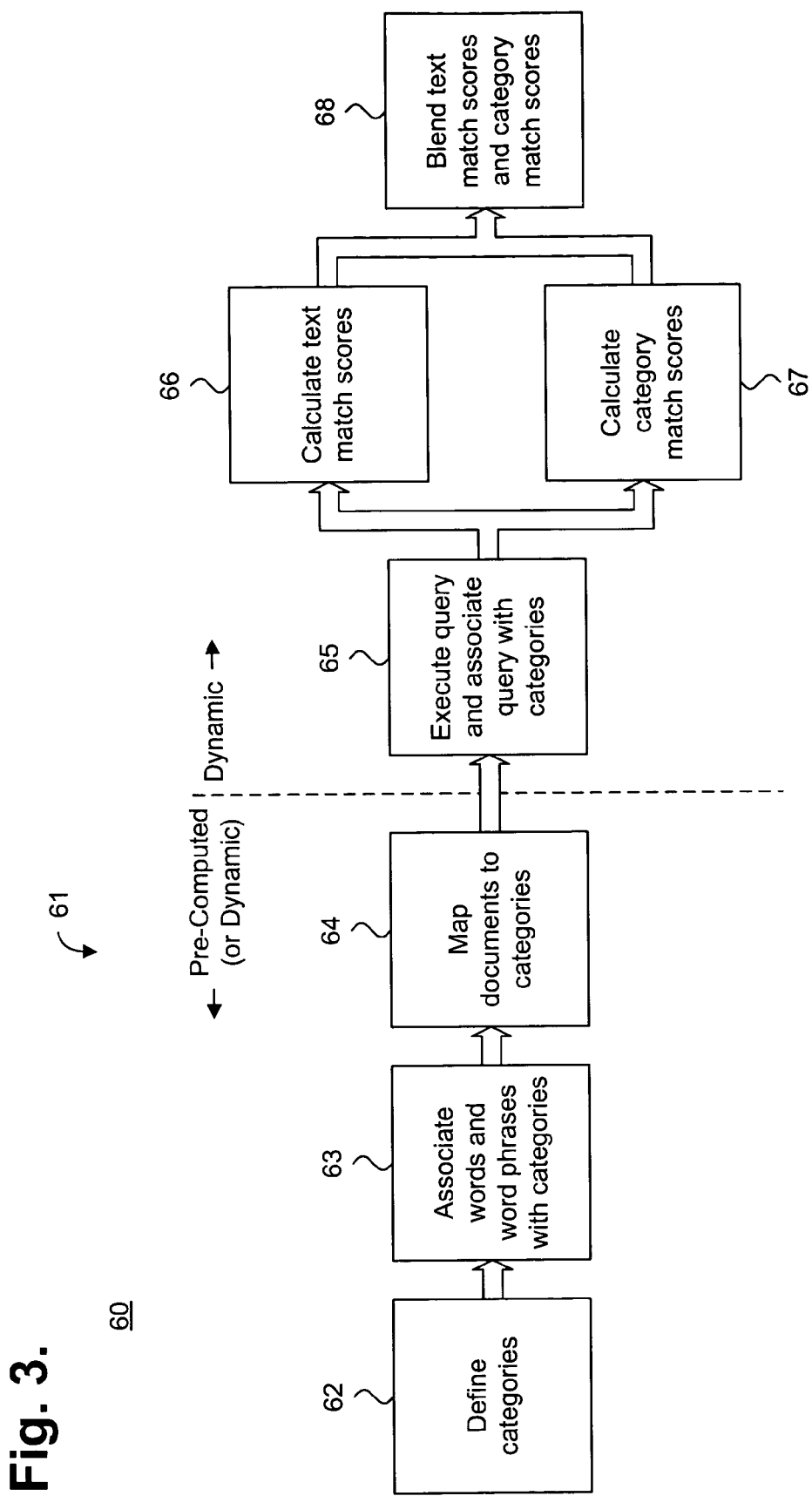
FIG. 3 is a process flow diagram showing composite scoring by the search engine of FIG. 2, in accordance with one embodiment.

FIG. 3 is a process flow diagram 60 showing composite scoring 61 by the search engine 31 of FIG. 2 in accordance with one embodiment. Initially, individual categories 43 are defined (Process 62). The categories 43 define a set of individual categories to identify and assimilate the content 28 and can be specified through a manual process, via automatically clustering, through a combination of automation and manual editing, or by similar means. The categories 43 can be specified as a list, organized in a hierarchical fashion, or defined in any searchable form of data structure. Categories may also overlap.

Figure 4A:
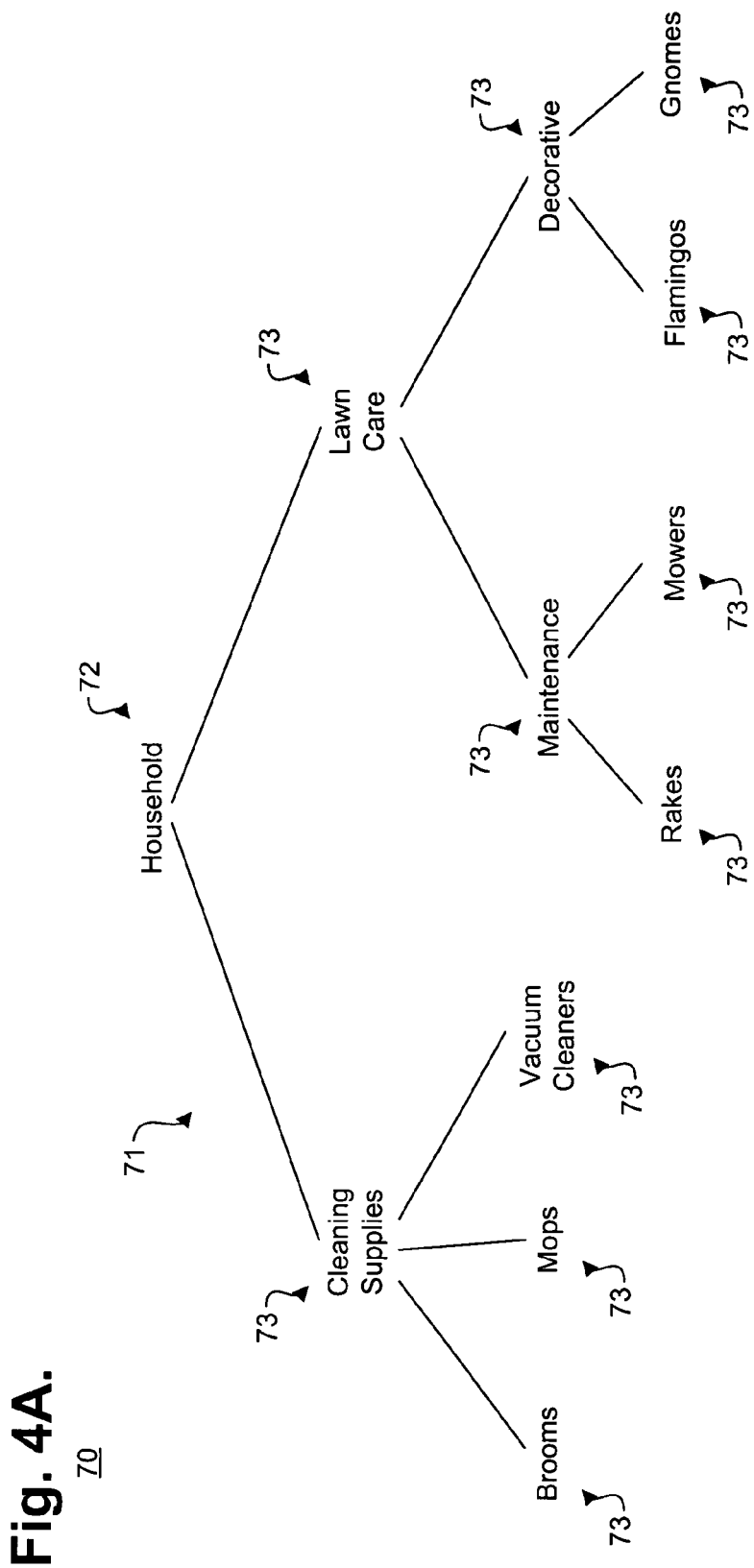
FIGS. 4A-D are hierarchical tree diagrams showing, by way of example, a set of categories and associated document mappings and word and word phrases.

Referring to FIG. 4A, a hierarchical tree diagram 70 shows, by way of example, a set of categories for a category hierarchy 71 relating to products offered for sale on a shopping Web site. An on-line shopping example is particularly useful to illustrate how categories 43 can assist in improving the quality of matches in a product searching context. Although products can be grouped into strong and natural categories that are widely established and easily understood, conventional approaches tend to simply sort products by price or paid placement, rather than by relevant category. These Web pages often have few hyperlinks because, for instance, the pages are short-lived or include so many pages as to be impracticable to identify and exploit. The following example combines a text score and category score to select between a pair of search results that would otherwise be equally relevant using basic text matching alone.

A hierarchical data structure is provided for illustrative purposes only and should not be construed as limiting. The category hierarchy 71 defines a root node 72, "Household." Each other node is related to the root node 72 through one or more links Non-root nodes 73, such as "Cleaning Supplies," "Lawn Care," "Maintenance," and "Decorative," represent subcategories and can also reflect specific items. Finally, non-root nodes 73, such as "Brooms," "Mops," "Vacuum Cleaners," "Rakes," "Mowers," "Flamingos," "Gnomes," reflect the specific items to which individual documents 53 and potential search query terms 39 are associated. The category hierarchy 71 could equally be defined as a list with each category including a full item description. For instance, "Flamingos" could be expressed as a list item, "Household>Lawn Care>Decorative>Flamingos." Other data structures and data organizations are possible.

Referring back to FIG. 3, words and word phrase associations 45 are associated with the categories 43 (Process 63) and the documents 53 are mapped to categories 43 as the document mappings 44 (Process 64). The document-to-category mappings 44 and word- and word phrase-to-category associations respectively include association strengths 51, 52 reflecting the relative degree to which each document 53, and word and word phrase 45 match a corresponding category 43. Category definitions (Process 62), document-to-category mappings (Process 63), and word- and word phrase-to-category associations (Process 64) can be pre-computed prior to query execution. In a further embodiment, the category definitions, document-to-category mappings, and word- and word phrase-to-category associations can be computed dynamically, or can include a combination of dynamically computed and pre-computed values.

Figure 4B:
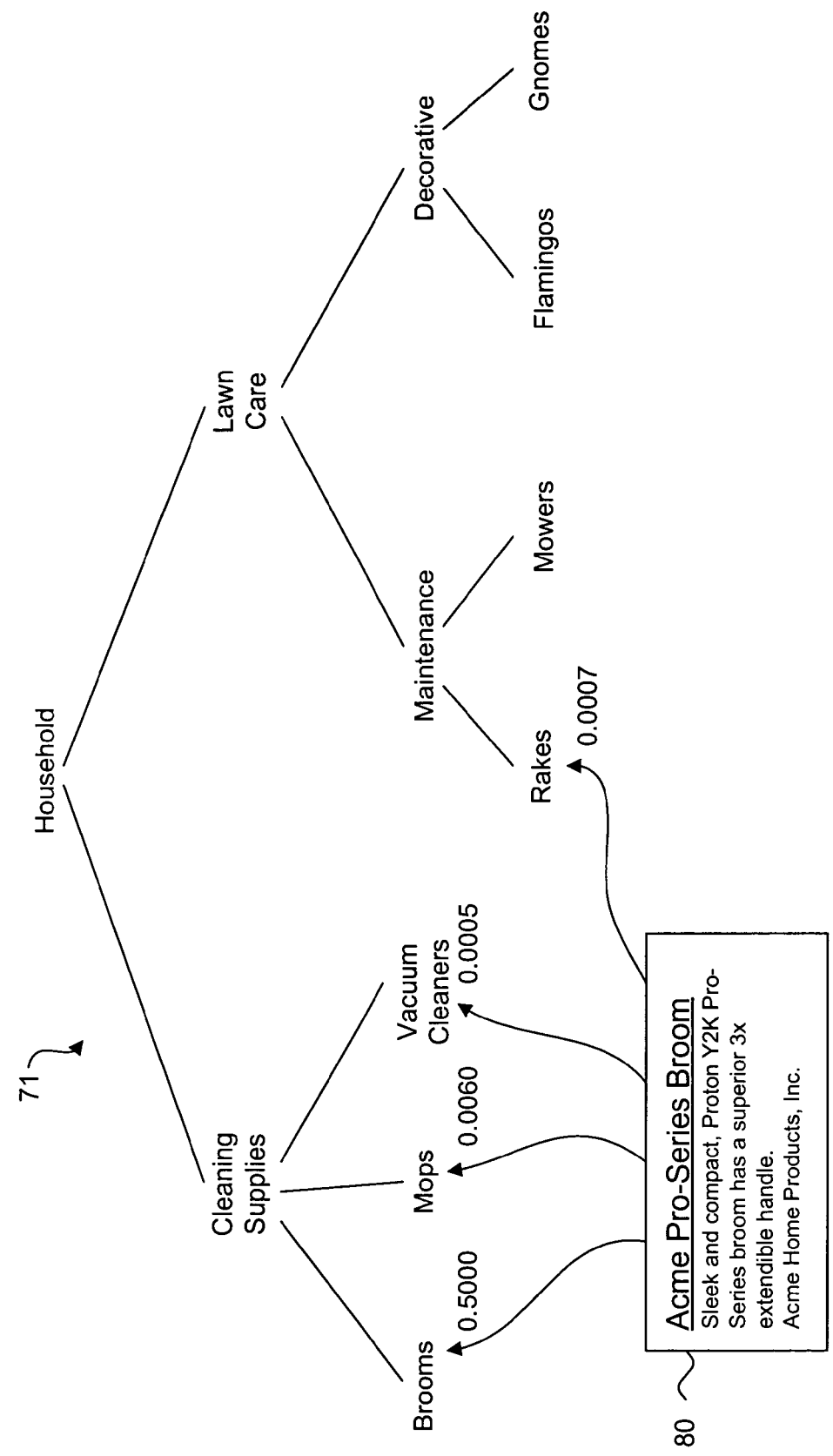

Referring to FIG. 4B, the hierarchical tree diagram 70 shows, by way of example, document mappings 44 and association strengths 51 for a first sample document 80. Each association strength 51 reflects the relative quality of the match between the document 80 and a corresponding category, as identified in a non-root node 73. For example, the document 80 has association strengths of 0.5000 relative to "Brooms," 0.0060 relative to "Mops," 0.0005 relative to "Vacuum Cleaners," and 0.0007 relative to "Rakes," indicating that the document 80 is most strongly related to the "Brooms" category and less strongly related to the other categories. Association strengths 51 of zero are omitted. In one embodiment, the association strengths 51 for all document mappings 44 sum to one, although other association strength assignments could be used. Alternatively, the association strengths could reflect relative weaknesses of matches between documents and categories, as well as other measures of quality of match.

Figure 4C:
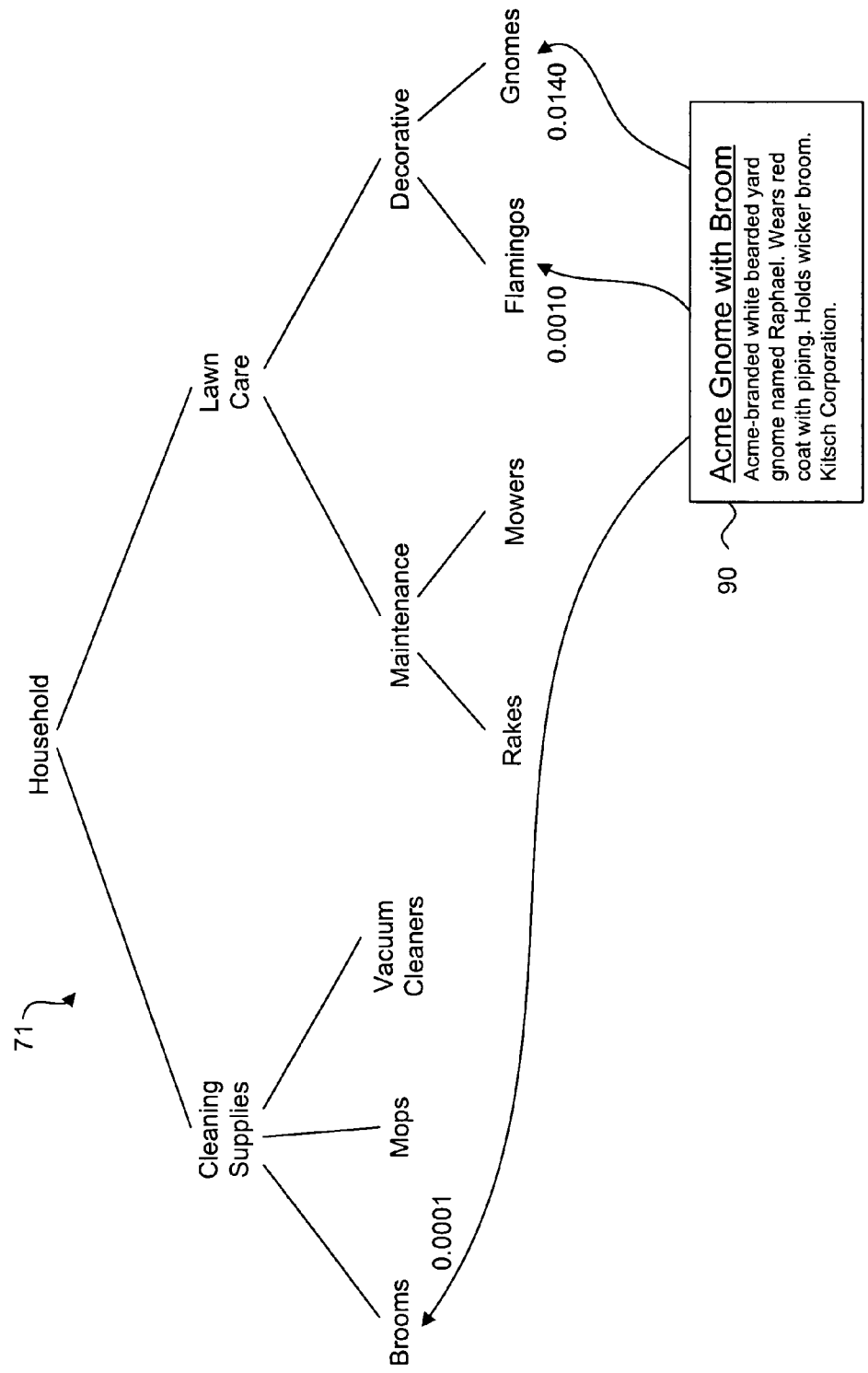

Similarly, referring next to FIG. 4C, the hierarchical tree diagram 70 shows, by way of example, document mappings 44 and association strengths 51 for a second sample document 90. As before, each association strength 51 reflects the relative quality of the match between the document 90 and a corresponding category, as identified in a non-root node 73. For example, the document 90 has association strengths of 0.0001 relative to "Brooms," 0.0010 relative to "Flamingos," and 0.0140 relative to "Gnomes," indicating that the document 80 is most strongly related to the "Gnomes" category and less strongly related to the other categories. Association strengths 51 of zero are omitted. Preferably, the association strengths 51 for all document mappings 44 sum to one, although other association strength assignments could be used. Alternatively, the association strengths could reflect relative weaknesses of matches between documents and categories, as well as other measures of quality of match.

Figure 4D:
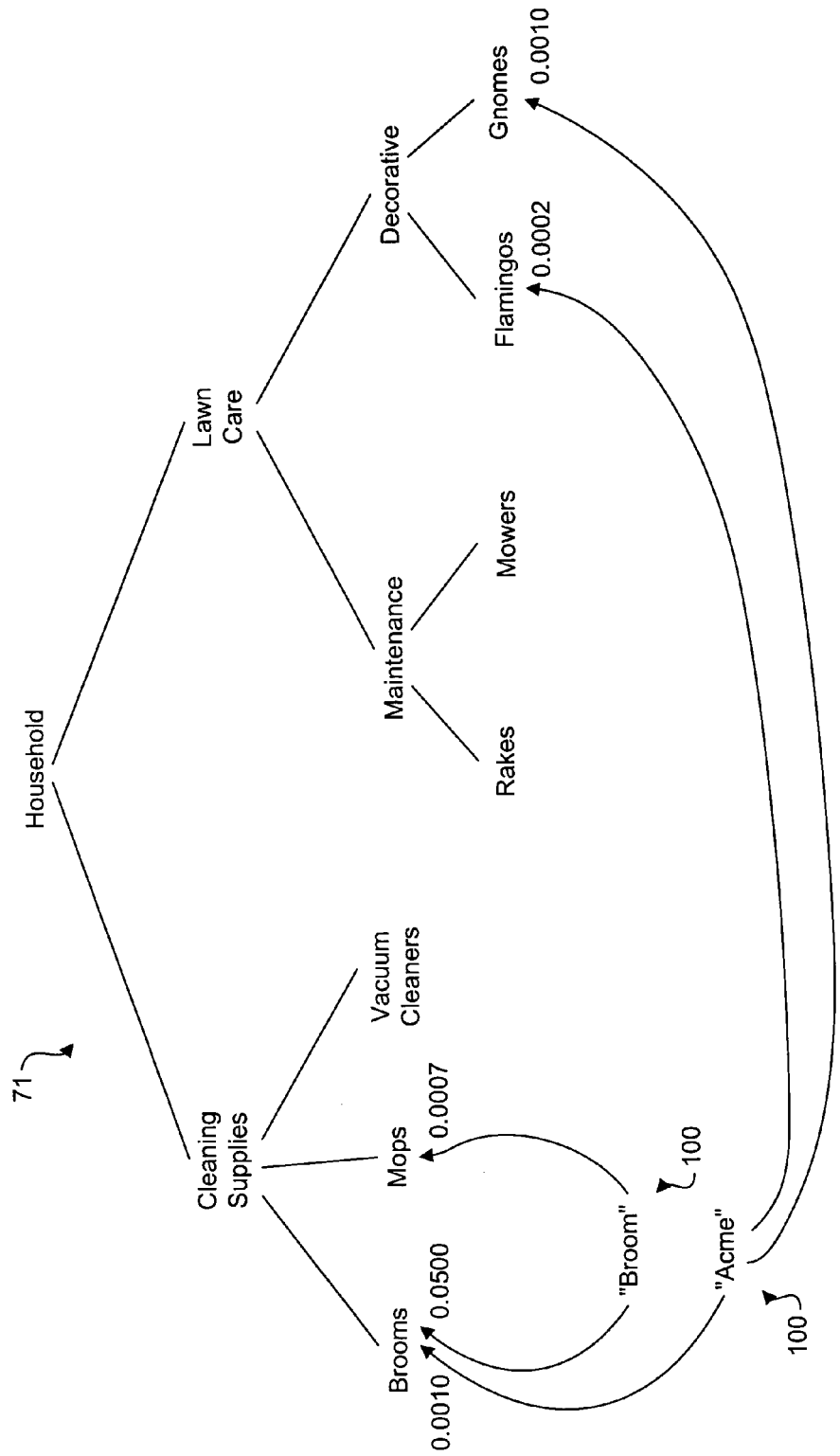

Referring next to FIG. 4D, the hierarchical tree diagram 70 shows, by way of example, word and word phrase associations 45 and association strengths 52 for a pair of words 100. Each association strength 52 reflects the relative quality of the match between each word 100 and a corresponding category, as identified in a non-root node 73. For example, the word "Acme" has association strengths of 0.0010 relative to "Brooms," 0.0002 relative to "Flamingos," and 0.0010 relative to "Gnomes." Similarly, the word "Broom" has association strengths of 0.0500 relative to "Brooms" and 0.0007 relative to "Mops." Association strengths 52 of zero are omitted. Alternatively, the association strengths could reflect relative weaknesses of matches between potential search query terms and categories, as well as other measures of quality of match.

Referring back to FIG. 3, a search query 38 is executed against the text corpus to identify document results 46 and the query is associated with the categories 43 (Process 65). Text match scores 47 are calculated for indicating a quality of match to the documents 53 in the text corpus 42 (Process 66). Referring once again to FIG. 4D, the search query 38 contains, "Acme Broom." Both documents 80, 90 have the same number of occurrences of the individual search terms 39, "Acme" and "Broom." Assuming that documents 80, 90 are the only document results 46, relative text match scores 47 of 0.50 are assigned to each document result 46.

Category match scores 50 are calculated to complement and fine tune the text match scores 47 (Process 67). First, for the first sample document 80, a category match score 50 determined as the dot product of the respective association strengths 51 and 52 for the top three categories 43 of the form provided in equation [1] yields:

$$(0.5000 \cdot 0.0010) + (0.0060 \cdot 0.0000) + (0.0005 \cdot 0.0000) + (0.5000 \cdot 0.0500) + (0.0060 \cdot 0.0007) + (0.0005 \cdot 0.0000) = 0.0255$$

Finally, the text match scores 47 and category match score 50 are logically combined using a blending function (Process 68). A composite score 40 determined using a weighted combination blending function of the form provided in equation [2] yields:

$$(0.34) \cdot (0.50) + (0.66) \cdot (0.0255) = 0.1868$$

where $\alpha$ is 0.34 and $\beta$ is 0.66, by way of example. Finally, a composite score 40 determined using a blending function provided as a weighted combination of the form provided in equation [3] yields:

$$(0.33) \cdot (0.50) + (0.33) \cdot (0.0255) + (0.34) \cdot (0.50) \cdot (0.0255) = 0.1778$$

where $\alpha$ is 0.33, $\beta$ is 0.33 and $\gamma$ is 0.34, by way of example.

Next, for the second sample document 90, a category match score 50 determined as the dot product of the respective association strengths 51 and 52 for the top three categories 43 of the form provided in equation [1] yields:

$$(0.0140 \cdot 0.0010) + (0.0010 \cdot 0.0002) + (0.0001 \cdot 0.0010) + (0.0140 \cdot 0.0500) + (0.0010 \cdot 0.0000) + (0.0001 \cdot 0.0000) = 0.0007$$

Finally, the text match scores 47 and category match score 50 are logically combined using a blending function (Process 68). A composite score 40 determined using a blending function of the form provided in equation [2] yields:

$$(0.34) \cdot (0.50) + (0.66) \cdot (0.0007) = 0.1705$$

where $\alpha$ is 0.34 and $\beta$ is 0.66, by way of example. Finally, a composite score 40 determined using a blending function of the form provided in equation [3] yields:

$$(0.33) \cdot (0.50) + (0.33) \cdot (0.0007) + (0.34) \cdot (0.50) \cdot (0.0007) = 0.1654$$

where $\alpha$ is 0.33, $\beta$ is 0.33 and $\gamma$ is 0.34, by way of example.

Comparing the composite scores 40 for the documents 80, 90 shows the first sample document 80 having a consistently higher composite score than the second sample document 90 for a search query 38 that contains "Acme Broom." Thus, by combining the text match scores 47 with the weighted category match scores 50, the sample document 80 provides a qualitatively better search result than sample document 90, even though both were equally relevant on the basis of basic text matching alone. Query-to-categories associations (Process 65), text match scoring (Process 66), category match scoring (Process 67) and score blending (Process 68) may be dynamically calculated subsequent to query execution.

Method Overview

Figure 5:
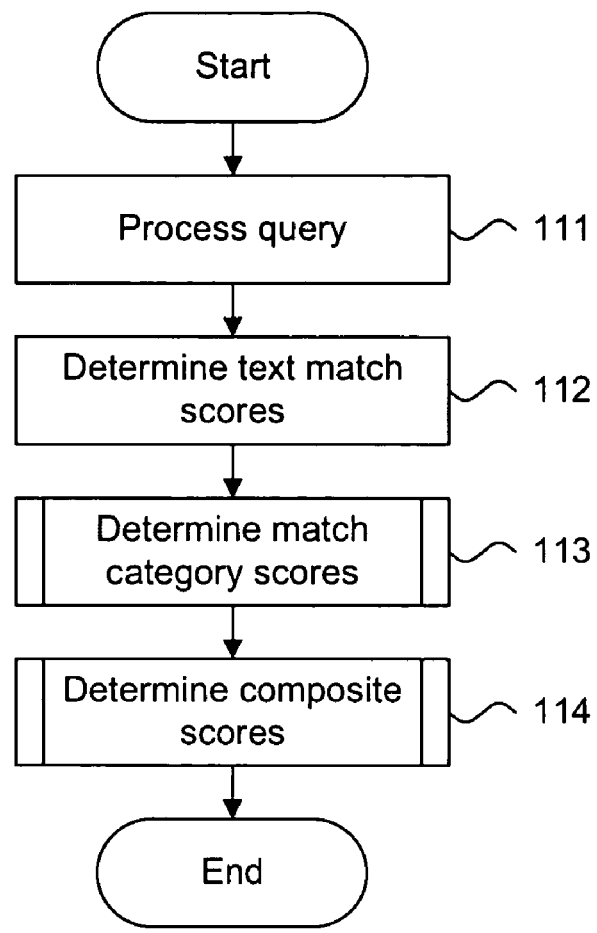
FIG. 5 is a flow diagram showing a method for determining a composite score for categorized search results, in accordance with one embodiment of the invention.

FIG. 5 is a flow diagram 110 showing a method for determining a composite score 40 for categorized search results, in accordance with one embodiment. The method 110 is described as a sequence of process operations or steps, which can be executed, for instance, by the scoring engine 31 of FIG. 2 or other components.

The method 70 begins by processing a search query 38 to identify document results 46 (block 111) and determining text match scores 47 (block 112). Category match scores 50 are determined (block 113), as further described below with reference to FIG. 6. Finally, composite scores 40 are determined (block 114), as further described below with reference to FIG. 7, for use by the search engine 23 or equivalent component. The routine then terminates.

Determining Category Scores

Figure 6:
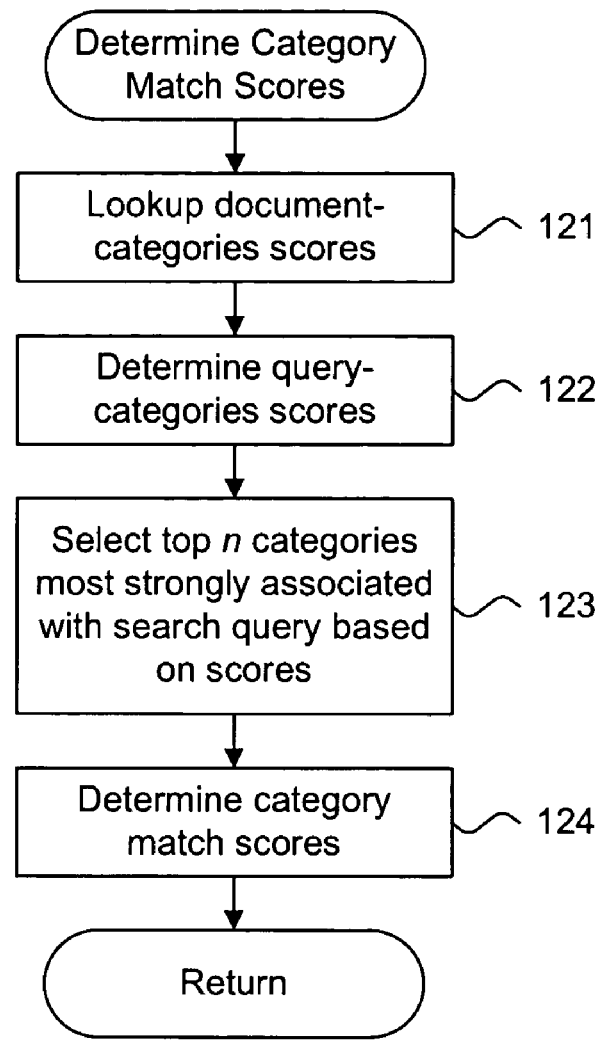
FIG. 6 is a flow diagram showing the routine for determining category match scores for use in the method of FIG. 5.

FIG. 6 is a flow diagram showing the routine 120 for determining category match scores for use in the method 110 of FIG. 5. One purpose of this routine is to calculate document-categories scores 48, query-categories scores 49, and category match scores 50.

As an initial step, the document-categories scores 48 are looked up (block 121). Query-categories scores 49 are then determined (block 122) based on the association strengths 52 in the associated word and word phrase associations 45. In a further embodiment, search criteria-category scores are used instead of the query-categories scores 49 when a search query 38 is either unnecessary or need not be entered. The top n categories 43 most strongly associated with the search query 38 based on the association strengths 51, 52 are selected (block 123). The category match scores 50 are determined (block 124) using, for example, a dot product of the document-categories scores 48 and query-categories scores 49. The routine then returns.

Determining Composite Scores

Figure 7:
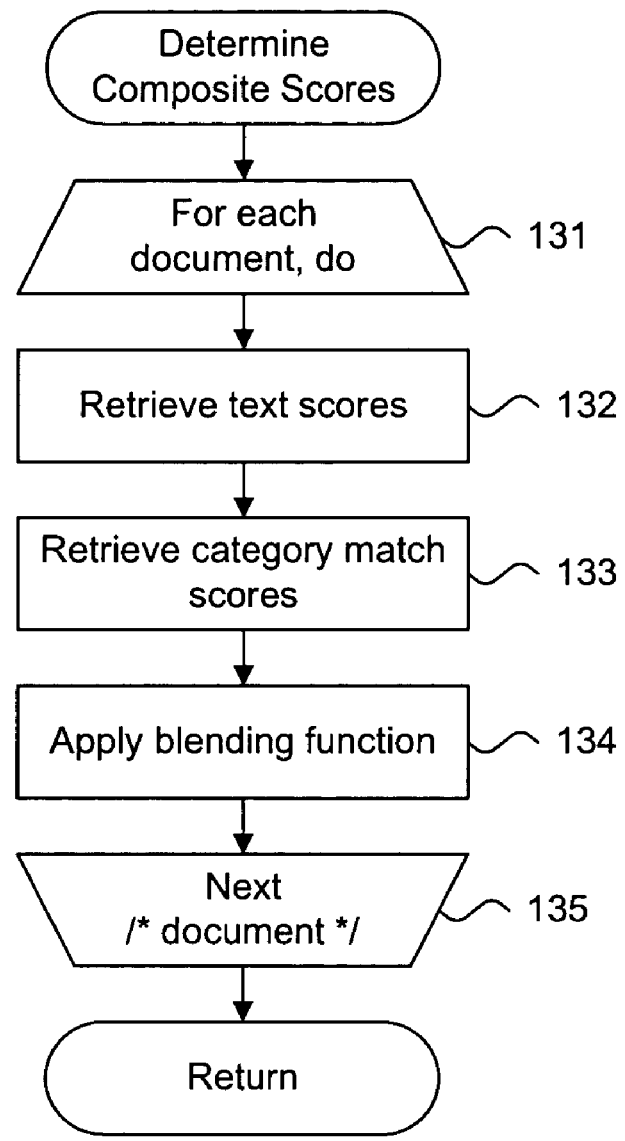
FIG. 7 is a flow diagram showing the routine for determining composite scores for use in the method of FIG. 5.

FIG. 7 is a flow diagram showing the routine 130 for determining composite scores for use in the exemplary method 110 of FIG. 5. One purpose of this routine is to determine a set of composite scores 40 based on the text match scores 47 and category match scores 50 for a given search query 38 and identified document results 46.

The identified document results 46 are iteratively processed (blocks 131-135), as follows. For each document result 46 (block 131), the text match scores 47 and category match scores 50 are retrieved (blocks 132 and 133, respectively). A composite score 40 is then determined by applying a blending function (block 134), as described above. Processing continues with the next document result 46 (block 135), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system comprising:
   one or more computers; and
   a nonvolatile storage coupled to the one or more computers and having instructions stored thereon which, when executed by the one or more computers, cause the one or more computers to perform operations comprising:
   receiving a search criteria;
   selecting one or more categories associated with the search criteria;
   selecting one or more documents responsive to the search criteria;
   calculating a text match score for each document based on degree of match between the responsive document and the search criteria;
   calculating a document-categories score for each of the one or more categories based on a degree of match between each document and each of the one or more categories; and
   calculating a search criteria-categories score for each of the one or more categories based on a degree of match between the search criteria and each of the one or more categories, wherein the search criteria-categories score for a particular category indicates the degree of match between the search criteria and the category;
   calculating a category match score for each document by combining the document-categories score of each of the one or more categories and the respective search criteria-categories score;
   calculating an overall score for each document based on the text match score of each document and the respective category match score;
   ranking the one or more documents according to the respective overall scores; and
   providing the ranked one or more documents.

2. A system according to claim 1, wherein the search criteria is a search query comprising one or more query terms, and
   wherein the text match score indicates a quality of match between the query terms and each document, and
   wherein the search criteria-categories score indicates a quality of match between the query terms and each of the one or more categories.

3. A system according to claim 1, wherein the search criteria includes a concept, the concept comprising one or more terms, and
   wherein the text match score indicates a quality of match between the terms and each document, and
   wherein the search criteria-categories score indicates a quality of match between the terms and each of the one or more categories.

4. A system according to claim 1, further comprising:
   defining the categories by aggregating a plurality of documents in the text corpus.

5. A system according to claim 1, further comprising:
   mapping one or more of the documents to one or more of the one or more categories; and
   associating one or more association strengths to matches between each document and the one or more categories.

6. A system according to claim 5, wherein the instructions further comprise:
   calculating the document-categories score based on the degree of match for each document using the association strengths.

7. A system according to claim 1, further comprising:
   associating words and word phrases with the one or more categories; and
   assigning association strengths to the word and word phrase associations.

8. A system according to claim 7, wherein the instructions further comprise:
   calculating the search criteria-categories score using a degree of match for the search criteria based on the association strengths of the word and word phrase associations.

9. A system according to claim 1, wherein the instructions further comprise:
   calculating an aggregate category match score using the document-categories score and the search criteria-categories score.

10. A system according to claim 9, wherein the instructions further comprise:
    evaluating a dot product of the document-categories score and the search criteria-categories score.

11. A system according to claim 1, wherein the blending function includes a weighted combination of the text match score and the category match score.

12. A system according to claim 11, wherein the composite score is determined in accordance with the equation:

$$S = \alpha \cdot S_t + \beta \cdot S_c$$

where S is the composite score, $S_e$ is the text match score, $S_c$ is the category match score and $\alpha$ and $\beta$ are weighting factors.

13. A system according to claim 11, wherein the composite score is determined in accordance with the equation:

$$S = \alpha S_t + \beta S_c + \gamma S_c + y \cdot S_t S_c$$

where S is the composite score, $S_t$ is the text match score, $S_c$ is the category match score, $\alpha$, $\beta$ and y are weighing factors.

14. A system according to claim 1, wherein the instructions further comprise:

specifying the categories as at least one of a list, a hierarchy and a searchable form of data structure.

15. A system according to claim 1, wherein the categories are applicable to shopping with one or more of the categories defining a category of goods or services.

16. A method for scoring documents using a server, comprising:
receiving a search criteria at a search engine;
identifying one or more categories associated with the search criteria;
identifying one or more documents responsive to the search criteria;
calculating a text match score for each document based on a degree of match between the respective document and the search criteria;
calculating a document-categories score for each of the one or more categories based on a degree of match between each document and each of the one or more categories;
calculating a search criteria-categories score for each of the one or more categories based on a degree of match between the search criteria and each of the one or more categories, wherein the search criteria-categories score for a particular category indicates the degree of match between the search criteria and the category;
calculating, using the server, a category match score for each document by combining the document-categories score of each of the one or more categories and the respective search criteria-categories score;
calculating an overall score for each document based on the text match score of each document and the respective category match score;
ranking the one or more documents according to the respective overall scores; and
providing the ranked one or more documents using a network interface.

17. A method according to claim 16, wherein the search criteria is a search query comprising one or more query terms, and
wherein the text match score indicates a quality of match between the query terms and each document, and
wherein the search criteria-categories score indicates a quality of match between the query terms and each of the one or more categories.

18. A method according to claim 16, wherein the search criteria includes a concept, the concept comprising one or more terms, and
wherein the text match score indicates a quality of match between the terms and each document, and
wherein the search criteria-categories score indicates a quality of match between the terms and each of the one or more categories.

19. A method according to claim 16, further comprising:
defining the categories by aggregating a plurality of documents in the text corpus.

20. A method according to claim 16, further comprising:
mapping one or more of the one or more documents to one or more of the one or more categories; and
assigning one or more association strengths to matches between each document and the one or more categories.

21. A method according to claim 20, wherein calculating the document-categories score further comprises:
calculating the document-categories score based on the degree of match for each document using the association strengths.

22. A method according to claim 16, further comprising:
associating words and word phrases with the one or more categories; and assigning association strengths to the word and word phrase associations.

23. A method according to claim 22, wherein calculating the search criteria-categories score comprises:
calculating the search criteria-categories score based on a qualitative degree of match for the search criteria based on the association strengths of the word and word phrase associations.

24. A method according to claim 16, further comprising:
calculating an aggregate category match score using the document-categories score and the search criteria-categories score.

25. A method according to claim 24, further comprising:
evaluating a dot product of the document-categories score and the search criteria-categories score as the aggregate category match score.

26. A method according to claim 16, wherein the blending function includes a weighted combination of the text match score and the category match score.

27. A method according to claim 26, further comprising:
determining the composite score in accordance with the equation:

$$S=\alpha S_t + \beta \cdot S_c$$

where S is the composite score, $S_t$ is the text match score, $S_c$ is the category match score and $\alpha$ and $\beta$ are weighting factors.

28. A method according to claim 26, further comprising:
determining the composite score in accordance with the equation:

$$S=\alpha S_t + \beta S_c + \gamma S_c + y S_t S_c$$

where S is the composite score, $S_t$ is the text match score, $S_c$ is the category match score, $\alpha$, $\beta$ and $\gamma$ are weighing factors.

29. A method according to claim 16, further comprising:
specifying the categories as at least one of a list, a hierarchy and a searchable form of data structure.

30. A method according to claim 16, wherein the categories are applicable to shopping with one or more of the categories defining a category of goods or services.

31. A nonvolatile storage encoded with a computer program comprising instructions that, when executed, operate to cause a computer to perform operations comprising:
receiving a search criteria;
identifying one or more categories associated with the search criteria;
identifying one or more documents responsive to the search criteria;
calculating a text match score for each document based on a degree of match between the respective document and the search criteria;
calculating a document-categories score for each of the one or more categories based on a degree of match between each document and each of the one or more categories;
calculating a search criteria-categories score for each of the one or more categories based on a degree of match between the search criteria and each of the one or more categories, wherein the search criteria-categories score for a particular category indicates the degree of match between the search criteria and the category;
calculating a category match score for each document by combining the document-categories score of each of the one or more categories and the respective search criteria-categories score;
calculating an overall score for each document based on the text match score of each document and the respective category match score;

ranking the one or more documents according to the respective overall scores; and providing the ranked one or more documents.

32. A storage according to claim 31, wherein the search criteria is a search query comprising one or more query terms, and wherein the text match score indicates a quality of match between the query terms and each document, and wherein the search criteria-categories score indicates a quality of match between the query terms and each of the one or more categories.

33. A storage according to claim 31, wherein the search criteria includes a concept, the concept comprising one or more terms, and wherein the text match score indicates a quality of match between the terms and each document, and wherein the search criteria-categories score indicates a quality of match between the terms and each of the one or more categories.

34. A storage according to claim 31, further comprising:

defining the categories by aggregating a plurality of documents in the text corpus.

35. A storage according to claim 31, further comprising:

mapping one or more of the documents to one or more of the one or more categories; and associating one or more association strengths to matches between each document and the one or more categories.

36. A storage according to claim 35, wherein the instructions further comprise:

calculating the document-categories score based on the degree of match for each document using the association strengths.

37. A storage according to claim 31, further comprising:

associating words and word phrases with the one or more categories; and assigning association strengths to the word and word phrase associations.

38. A storage according to claim 37, wherein the instructions further comprise:

calculating the search criteria-categories score using a degree of match for the search criteria based on the association strengths of the word and word phrase associations.

39. A storage according to claim 31, wherein the instructions further comprise:

calculating an aggregate category match score using the document-categories score and the search criteria-categories score.

40. A storage according to claim 39, wherein the instructions further comprise:

evaluating a dot product of the document-categories score and the search criteria-categories score.

41. A storage according to claim 31, wherein the blending function includes a weighted combination of the text match score and the category match score.

42. A storage according to claim 41, wherein the composite score is determined in accordance with the equation:

$$S=a\ St+J\cdot Se$$

where S is the composite score, Se is the text match score, Sc is the category match score and I and J are weighting factors.

43. A storage according to claim 41, wherein the composite score is determined in accordance with the equation:

$$S=I\ St+J\ Sc+K\ Sc+y.\ St\ Sc$$

where S is the composite score, St is the text match score, Sc is the category match score, I, J and y are weighing factors.

44. A storage according to claim 31, wherein the instructions further comprise:

specifying the categories as at least one of a list, a hierarchy and a searchable form of data structure.

45. A storage according to claim 31, wherein the categories are applicable to shopping with one or more of the categories defining a category of goods or services.

* * * * *

UNITED STATES PATENT AND TRADEMARK OFFICE
CERTIFICATE OF CORRECTION

PATENT NO. : 7,814,085 B1
APPLICATION NO. : 10/787648
DATED : October 12, 2010
INVENTOR(S) : Karl Robert Pfleger and Brian Larson It is certified that error appears in the above-identified patent and that said Letters Patent is hereby corrected as shown below:

Column 12, Line 56 at Claim 12; replace:
"$S = a\ S_t + \beta \cdot S_e$" with
-- $S = \alpha \cdot S_t + \beta \cdot S_c$ --

Column 12, Line 58 at Claim 12; replace:
"where S is the composite score, Se is the text match score, $S_c$" with
-- where S is the composite score, $S_t$ is the text match score, $S_c$ --

Column 12, Line 62 at Claim 13; replace:
"$S = \alpha S_t + \beta S_c + \gamma S_c + y \cdot S_t S_c$" with
-- $S = \alpha \cdot S_t + \beta \cdot S_c + \gamma \cdot S_t \cdot S_c$ --

Column 12, Line 65 at Claim 13; replace:
"is the category match score, α, β and y are weighing factors." with
-- is the category match score, α, β and γ are weighing factors. --

Column 14, Line 31 at Claim 28; replace:
"$S = \alpha S_t + \beta S_c + \gamma S_c + y S_t S_c$" with
-- $S = \alpha \cdot S_t + \beta \cdot S_c + \gamma \cdot S_t \cdot S_c$ --

Column 16, Line 21 at Claim 42; replace:
"$S = \alpha\ St + J \cdot Se$" with
-- $S = \alpha\ S_t + \beta \cdot S_c$ --

Column 16, Lines 22-23 at Claim 42; replace:
"where S is the composite score, Se is the text match score, Sc is the category match score and I and J are weighting factors." with
-- where S is the composite score, $S_t$ is the text match score, $S_c$ is the category match score and α and β are weighting factors. --

Signed and Sealed this
Nineteenth Day of March, 2013

Teresa Stanek Rea
*Acting Director of the United States Patent and Trademark Office*

CERTIFICATE OF CORRECTION (continued)
U.S. Pat. No. 7,814,085 B1

Column 16, Line 27 at Claim 43; replace:
 "S=I St+J Sc+K Sc+y· StSc" with
-- $S = \alpha S_t + \beta S_c + \gamma \cdot S_t S_c$ --

Column 16, Line 27 at Claim 43; replace:
 "S=I St+J Sc+K Sc+y· StSc" with
-- $S = \alpha S_t + \beta S_c + \gamma \cdot S_t S_c$ --

Column 16, Line 28 at Claim 43; replace:
 "where S is the composite score, St is the text match score, Sc is the category match score, I, J and y are weighing factors." with
-- where S is the composite score, $S_t$ is the text match score, $S_c$ is the category match score, $\alpha$, $\beta$ and $\gamma$ are weighing factors. --